(12) United States Patent
Gutknecht et al.

(10) Patent No.: US 6,807,184 B2
(45) Date of Patent: Oct. 19, 2004

(54) METHOD AND APPARATUS FOR PARAMETER BORROWING FOR NETWORK ADDRESS TRANSLATOR CONFIGURATION

(75) Inventors: Gary Robert Gutknecht, Noblesville, IN (US); Mark Ryan Mayernick, Carmel, IN (US); David Lee Ryan, Noblesville, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 10/339,681

(22) Filed: Jan. 9, 2003

(65) Prior Publication Data

US 2003/0147395 A1 Aug. 7, 2003

Related U.S. Application Data

(60) Provisional application No. 60/355,664, filed on Feb. 6, 2002.

(51) Int. Cl.[7] .............................................. H04L 12/64
(52) U.S. Cl. ...................................................... 370/401
(58) Field of Search ................................ 370/389, 393, 370/401, 420

(56) References Cited

U.S. PATENT DOCUMENTS

| | | | | |
|---|---|---|---|---|
| 5,812,819 | A | | 9/1998 | Rodwin et al. .............. 395/500 |
| 5,884,024 | A | * | 3/1999 | Lim et al. .................... 713/201 |
| 6,028,848 | A | * | 2/2000 | Bhatia et al. ................ 370/257 |
| 6,070,187 | A | | 5/2000 | Subramaniam et al. ...... 709/220 |
| 6,091,737 | A | * | 7/2000 | Hong et al. .................. 370/431 |
| 6,138,162 | A | | 10/2000 | Pistriotto et al. ........... 709/229 |
| 6,178,455 | B1 | * | 1/2001 | Schutte et al. .............. 709/228 |
| 6,195,705 | B1 | * | 2/2001 | Leung ......................... 709/245 |
| 6,208,656 | B1 | * | 3/2001 | Hrastar et al. .............. 370/401 |
| 6,243,749 | B1 | * | 6/2001 | Sitaraman et al. .......... 709/223 |
| 6,249,523 | B1 | * | 6/2001 | Hrastar et al. .............. 370/401 |
| 6,405,253 | B1 | * | 6/2002 | Schutte et al. .............. 709/228 |
| 6,427,174 | B1 | * | 7/2002 | Sitaraman et al. .......... 709/245 |

OTHER PUBLICATIONS

Newton, H. "Newton's Telecom Dictionary" 17th ed. Feb. 2001. p. 554.*
Droms, R., "Dynamic Host Configuration Protocol", Network Working Group, RFC 2131, Mar. 1997.*
Senie, D., "Network Address Translator (NAT)—Friendly Application Design Guidlines", Network Working Group, RFC 3235, Jan. 2002.*
Egevang, K. et al., "The IP Network Address Translator (NAT) ", Network Working Group, RFC 1631, May 1994.*
Alexander, S. et al., "DHCP Options and BOOTP Vendor Extensions", Network Working Group, RFC 2132, Mar. 1997.
Newton, H., Newton's Telecom Dictionary, 18th Edition, p. 595, "proxy".
PCT Search Report dated: Jul. 11, 2003.

* cited by examiner

*Primary Examiner*—Huy D. Vu
*Assistant Examiner*—Daniel Ryman
(74) *Attorney, Agent, or Firm*—Joseph S. Tripoli; Ronald H. Kurdyla; Guy H. Eriksen

(57) ABSTRACT

A method and apparatus for parameter borrowing for network address translator (NAT) configuration by receiving, at a first dynamic host configuration protocol (DHCP) device, a DHCP lease request from a client, determining, from the DHCP lease request, first communication parameters of the client, and enabling the determined first communication parameters to be used by a second DHCP device, the determined first communication parameters adapted for use in upstream DHCP lease requests by the second DHCP device.

18 Claims, 4 Drawing Sheets

METHOD AND APPARATUS FOR PARAMETER BORROWING FOR NETWORK ADDRESS TRANSLATOR CONFIGURATION

CROSS-REFERENCE TO RELATED APPLICATIONS

This application claims the benefit of U.S. Provisional Application Ser. No. 60/355,664, filed Feb. 6, 2002; which is incorporated herein by reference in its entirety.

FIELD OF THE INVENTION

This invention relates to the field of data networks and, more specifically, to Network Address Translator (NAT) configuration.

BACKGROUND OF THE INVENTION

The Transport Control Protocol/Internet Protocol (TCP/IP) suite of protocols is used in many of today's networks. A TCP/IP-based network, such as the Internet, provides a data packet routing system for communication between nodes (e.g., end-user workstations, servers, network devices, etc.) connected to the Internet. In traditional destination address based routing, a source node specifies as a destination Internet protocol (IP) address the IP address of the destination node in an IP datagram. The IP datagram is encapsulated in a physical frame, or packet, and sent to a router attached to the same network as the source node. The router receiving the frame, in turn, parses the IP datagram to determine the destination IP address. The router selects a router enroute to the destination node and again encapsulates the datagram in a physical frame for transmission to the router. This process continues until the IP datagram reaches the network to which the destination node is connected.

Growth of the Internet, as well as private "intranets", has placed demands not only on bandwidth requirements, but also the Internet routing protocols and the available IP address space. In addition, because of the increased demand for Internet access, the number of available IP addresses is rapidly diminishing and most Internet Service Providers (ISPs) will only allocate one IP address to a single customer. Typically with only one IP address, a user can have only one computer connected to the Internet at one time.

One proposal for overcoming the shortage of IP addresses is set forth in the Informational Request For Comments (RFC) 1631, May, 1994, entitled "The IP Network Address Translator (NAT)." The proposal is based on reusing existing IP addresses by placing NAT software, and NAT tables or databases, at each edge networking devices (i.e., routers or cable modems) between routing domains. The NAT table at each participating router comprises local, reusable IP addresses for use in data packets transmitted within local routing domains, and assigned, globally unique IP addresses for use in data packets transmitted outside local routing domains, that is, over the Internet. There are, though, several limitations associated with upgrading existing edge networking devices to include the NAT feature.

One limitation associated with upgrading an existing edge networking device to include the NAT feature is due to the fact that an existing edge networking device is typically originally configured to have only one MAC address. However, the addition of the NAT feature typically requires an edge networking device to have three MAC addresses; one for the edge networking device, and one each for a DHCP client and a DHCP server associated with the NAT feature upgrade.

Another limitation associated with upgrading an existing edge networking device to include the NAT feature is in the reconfiguration of the edge networking device. The upgrade to include the NAT feature typically requires a user to input configuration parameters, such as MAC addresses or PC hostnames, for proper integration of the new NAT device with the system devices. These parameters may not be known to the user or may be difficult for the user to retrieve.

SUMMARY OF THE INVENTION

The invention comprises a method and apparatus (140) for parameter borrowing for network address translator (NAT) configuration.

In one embodiment of the present invention, a method includes receiving, at a first dynamic host configuration protocol (DHCP) device, a DHCP lease request from a client, determining, from the DHCP lease request, first communication parameters of the client, and enabling the determined first communication parameters to be used by a second DHCP device, the determined first communication parameters adapted for use in upstream DHCP lease requests by the second DHCP device.

In another embodiment of the present invention a method includes receiving, at a first dynamic host configuration protocol (DHCP) device, a DHCP lease request from a client, determining, from the DHCP lease request, first communication parameters of the client, enabling the determined first communication parameters to be used by a second DHCP device, the determined first communication parameters adapted for use in upstream DHCP lease requests by the second DHCP device, determining, from a DHCP lease grant sent in response to the upstream DHCP lease request by the second DHCP device, second communications parameters, and enabling the determined second communication parameters to be used by the first DHCP device.

In another embodiment of the present invention, an apparatus includes a first DHCP device, for receiving DHCP lease requests from a client, a second DHCP device, for generating upstream DHCP lease requests, a memory for storing communications parameters and instructions, and a processor. Upon executing the stored instructions, the processor is configured to receive at the first DHCP device a DHCP lease request from a client, to determine, from the DHCP lease request, first communication parameters of the client, and to enable the determined first communication parameters to be used by a second DHCP device, the determined first communication parameters adapted for use in upstream DHCP lease requests by the second DHCP device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention will be described within the context of a computer network and associated devices connected to the Internet. However, it will be appreciated by those skilled in the art that the subject invention may be advantageously employed in any communications system implementing Network Address Translator (NAT). Thus, it is contemplated by the inventors that the subject invention has broad applicability beyond the network systems described herein.

Figure 1:
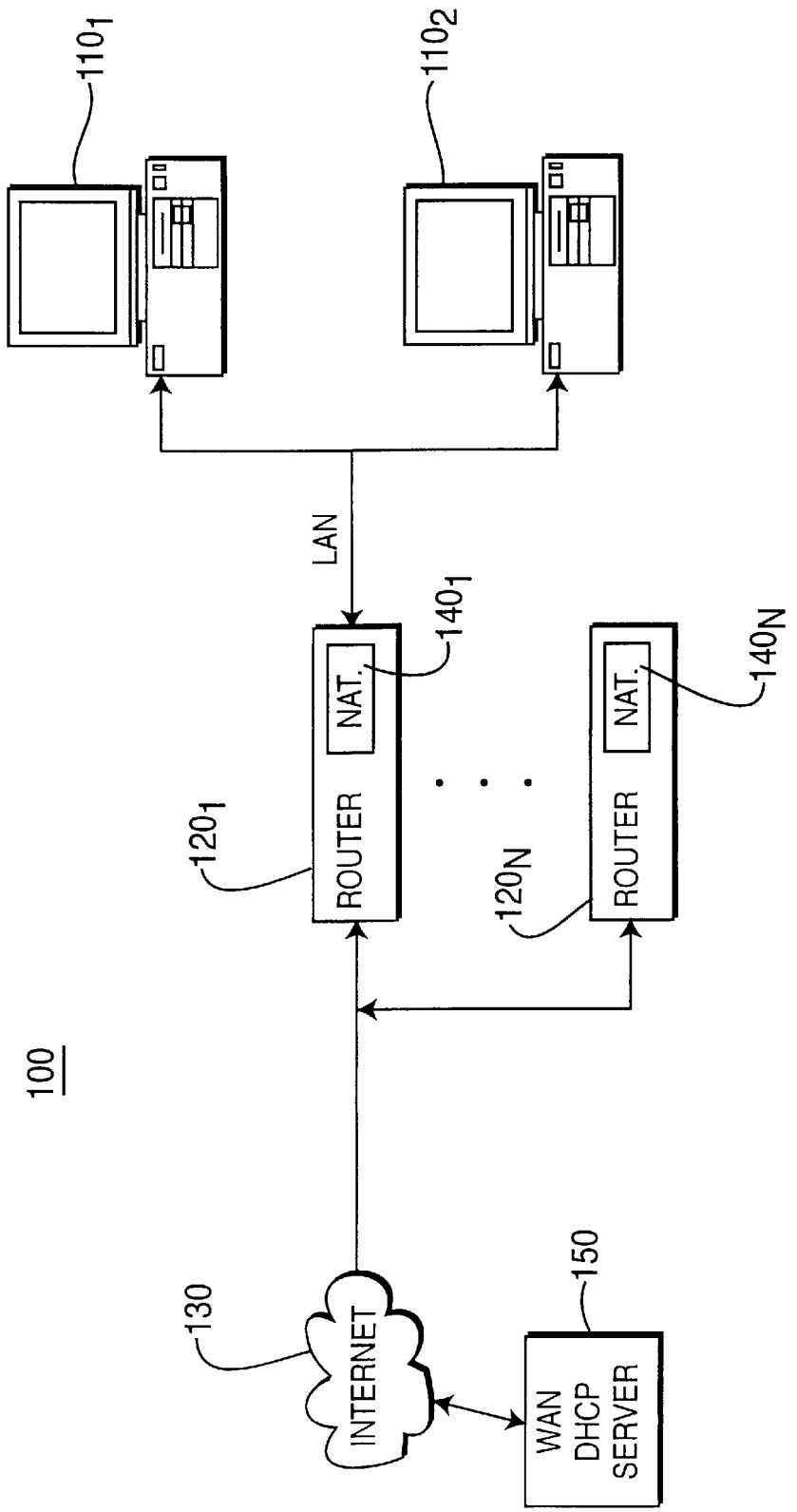
FIG. 1 depicts a high-level block diagram of an Internet network, including an embodiment of the present invention.

FIG. 1 depicts a high-level block diagram of an Internet network 100 including an exemplary embodiment of the present invention. The Internet network 100 of FIG. 1 comprises a plurality of computer premises equipment (CPE) devices (illustratively two personal computers (PCs)) $110_1$ and $110_2$ (collectively PCs 110), a plurality of edge networking devices (illustratively routers) $120_1$–$120_N$, and the Internet 130. In addition, each of the plurality of routers $120_1$–$120_N$ comprises a network address translator (NAT) device $140_1$–$140_N$, respectively. The PCs 110, together, form a local area network (LAN) and the Internet 130 forms a wide area network (WAN). The WAN further comprises a WAN DHCP server 150. Although in FIG. 1, the NAT devices $140_1$–$140_N$ are depicted as being respectively incorporated within the plurality of routers $120_1$–$120_N$, it will be appreciated by those skilled in the art that the NAT devices $140_1$–$140_N$ can be incorporated in other edge networking devices such as cable modems. Alternatively, the NAT devices $140_1$–$140_N$ can comprise separate units.

Figure 2:
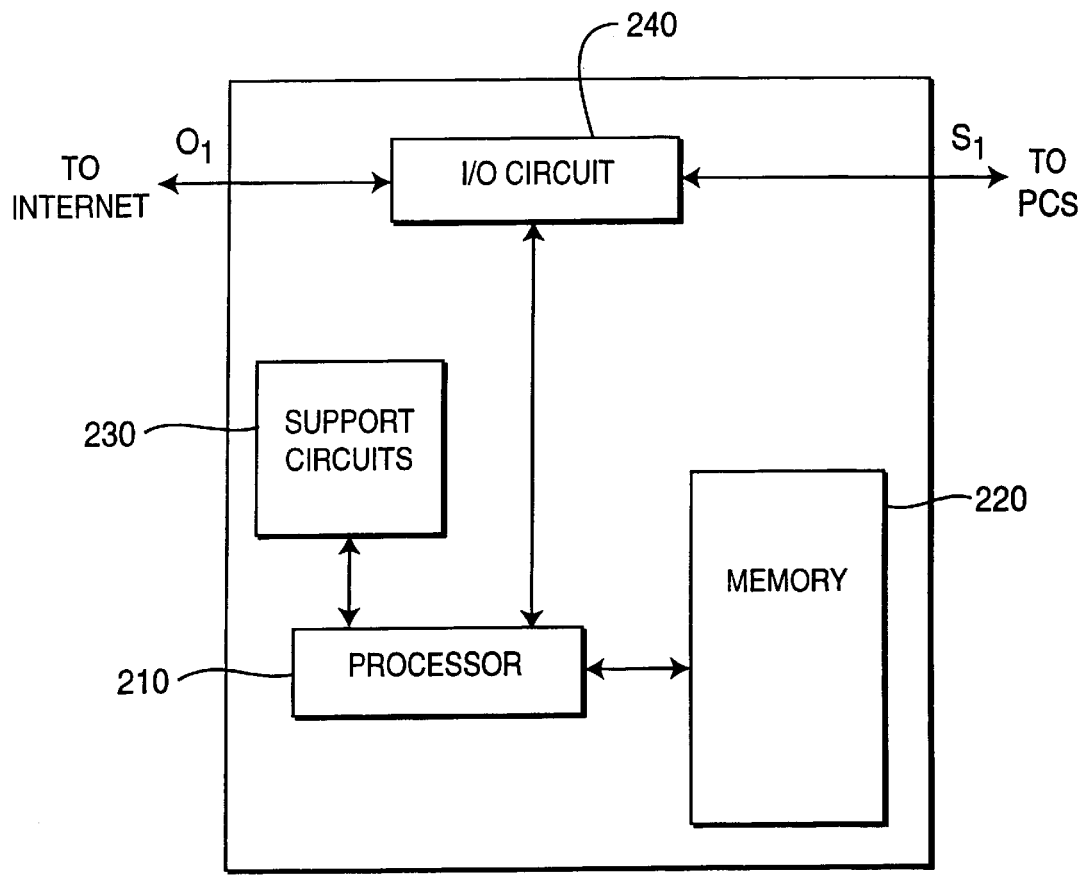
FIG. 2 depicts a high-level block diagram of an embodiment of a network address translator suitable for use in the Internet network of FIG. 1.

FIG. 2 depicts a high-level block diagram of an embodiment of the NAT device 140 of FIG. 1. The NAT device 140 of FIG. 2 comprises a processor 210 as well as a memory 220 for storing the algorithms and control programs. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The NAT device 140 also includes input-output circuitry 240 that forms an interface between the various elements communicating with the NAT device 140. For example, in the embodiment of FIG. 1, the NAT device 140 communicates with the PCs 110 via a signal path S1 and to the Internet 130 via signal path O1.

Although the NAT device 140 of FIG. 2 is depicted as a general purpose computer that is programmed to perform various control functions in accordance with the principles of the present invention, the invention can be implemented in hardware, for example, as an application specific integrated circuit (ASIC). As such, the process steps described herein are intended to be broadly interpreted as being equivalently performed by software, hardware, or a combination thereof.

Furthermore, although the NAT device 140 of FIG. 2 is depicted as a general purpose computer that is programmed to perform various control functions in accordance with the present invention, the NAT device 140 can be incorporated as software into an existing computer of an edge networking device to be upgraded with the NAT feature, such as a router or a cable modem.

Figure 3:
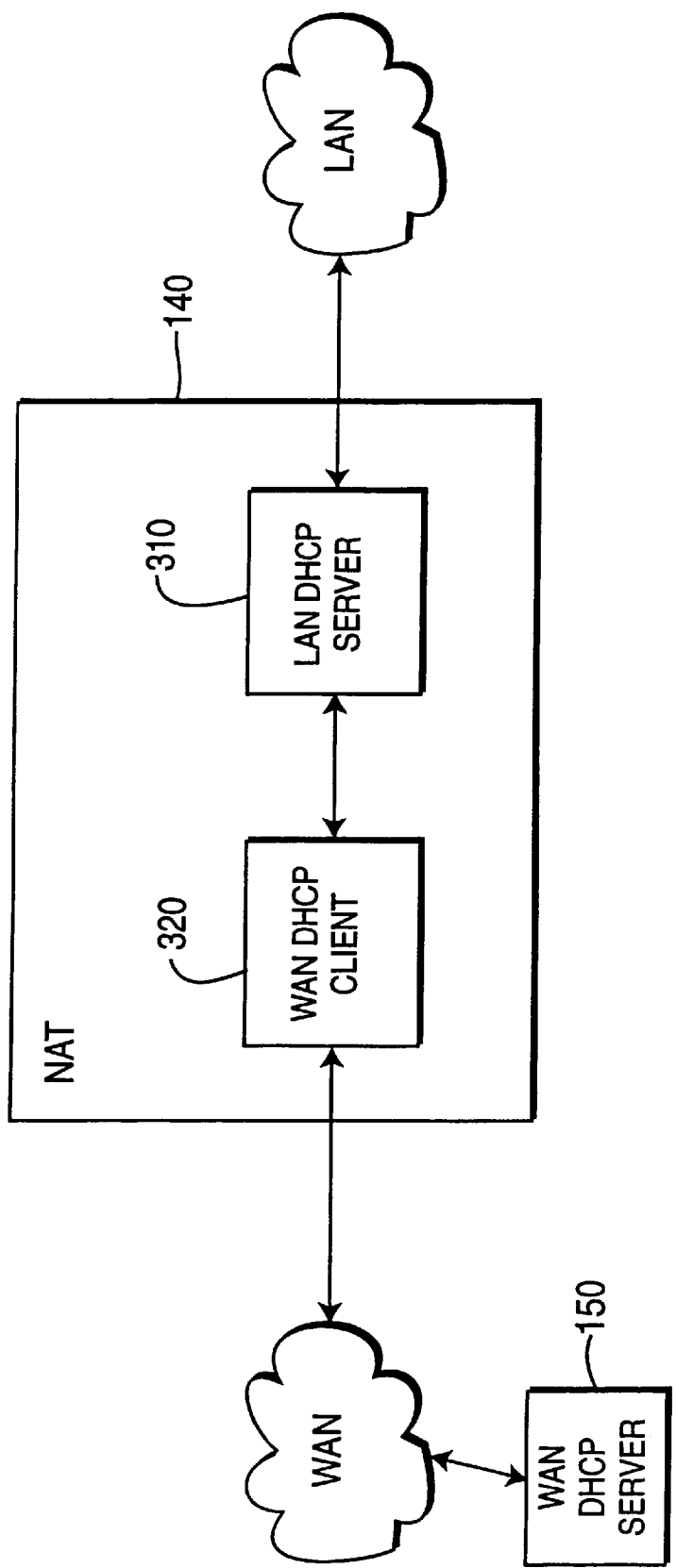
FIG. 3 depicts a block diagram illustrating a network address translation process in accordance with the principles of the present invention.

FIG. 3 depicts a block diagram illustrating network address translation of the NAT device 140 in accordance with the principles of the present invention. The NAT device 140 of FIG. 3 comprises a DHCP server 310 on the LAN side of the Internet network 100 of FIG. 1 and a DHCP client 320 on the WAN side. Although the DHCP server 310 and the DHCP client 320 are depicted in FIG. 3 as separate components within the NAT device 140, the DHCP server 310 and the DHCP client 320 can be essentially computer programs or other firmware or software that implement Dynamic Host Configuration Protocol (DHCP) defined in Internet RFC-2131 and RFC-2132, which are incorporated herein by reference in their entireties.

CPE devices are often provisioned on a system by using unique identifiers, such as MAC addresses or PC hostname. As such, borrowing host names from CPE devices on the LAN side of a NAT device for use in a WAN DHCP request allows provisioning to be performed by a NAT device, according to the present invention, without additional user configuration. For proper provisioning in this scheme, the WAN side of the NAT device acts as the CPE device from the WAN's point of view. Therefore, the WAN side of the NAT device needs to use the same unique identifier that his original PC used to be properly provisioned (obtain a DHCP lease) on the WAN network. Similarly, borrowing a gateway MAC address from the WAN side of the NAT device for use as a LAN gateway MAC address on the LAN side of the NAT device allows the update of an existing edge networking device to include the NAT feature without requiring additional unique MAC addresses to be allocated to the updated edge networking device.

In one embodiment of the present invention, the NAT device 140 self-configures its communication parameters. Previously, when a component such as a conventional NAT device is added to an edge networking device, such as a router or a cable modem, a user must provision the added device with known communication parameters, such as MAC addresses and host names, to integrate the added device to the network for proper functionality. Furthermore, if a NAT device is used, a DHCP server and/or a DHCP client associated with the added NAT must be provided unique communication parameters, such as unique MAC addresses. By contrast, the NAT device 140 of the present invention, avoids these shortcomings. Specifically, when a CPE device (PC 110) requests a DHCP lease from the NAT device 140, the PC 110 reveals its communication parameters, such as MAC address and host name, to the DHCP server 310 of the NAT device 140. The DHCP server 310 determines these parameters and maintains a list of all of the PCs 110 and their respective communication parameters. These parameters are shared with the DHCP client 320 of the NAT device 140 for making DHCP lease requests on a WAN side (Internet 130) of the NAT device 140.

Similarly, when the DHCP client 320 receives a lease grant from, for example, the WAN DHCP server 150 of the Internet network 100 of FIG. 1, the granting WAN DHCP server 150 reveals its communication parameters, such as MAC address, to the DHCP client 320 of the NAT device 140. The DHCP client 320 determines these communication parameters and maintains a list of all of the WAN devices and their respective communication parameters. These parameters are shared with the DHCP sever 310 of the NAT device 140.

As such, because of the learning ability of the NAT device 140 and the sharing of the learned parameters between the DHCP server 310 and the DHCP client 320, a user does not have to manually configure the NAT device 140 for use within an existing network or device and additional MAC addresses do not have to be assigned to an added NAT device.

Referring to FIG. 1, during upstream transmission a PC 110 requests a DHCP lease from the DHCP server 310 (FIG. 3) of the NAT device 140. At the time the DHCP lease is granted, the DHCP server 310 determines the PC's communication parameters, such as the MAC address and the host name, from the DHCP lease request. The DHCP server 310 then checks a parameter list in the memory 220 (FIG. 2) within the NAT device 140 to determine if the communication parameters are new (not previously stored). If the communication parameters are new, the DHCP server 310 then stores the determined parameters in the memory 220.

The DHCP client 320 (FIG. 3) of the NAT device 140 subsequently searches the memory 220 within the NAT device 140 and selects a MAC address/host name pair to use in its DHCP lease request upstream to, for example, the WAN DHCP server 150. If the DHCP lease request from the WAN DHCP server 150 is not granted using the selected parameter pair, the DHCP client 320 again searches the memory 220 within the NAT device 140 for another MAC address/host name pair to use in its DHCP lease request upstream to the WAN DHCP server 150. The DCHP client 320 continues to search the memory containing the MAC address/host name pairs until a MAC address/host name pair is found that results in a DHCP lease grant from the WAN DHCP server 150 to the DHCP client 320.

Upon receiving a lease grant from the WAN DHCP server 150, the DHCP client 320 determines the communication parameters, such as the MAC address, from the lease grant from the WAN DHCP server 150. The DHCP client 320 then checks a parameter list in the memory 220 (FIG. 2) within the NAT device 140 to determine if the communication parameters are new (not previously stored). If the communication parameters are new, the DHCP client 320 then stores the determined parameters in the memory 220.

During downstream transmission, the DHCP server 310 must function as a gateway (router) for the LAN network (PCs 110) to communicate with the WAN network (Internet 130). In order to behave as a router, the DHCP server 310 assumes an identifier that the Internet 130 associates with its router (not shown) and a corresponding MAC address that the local LAN network can resolve the router to. As such, the DHCP server 310 uses one of the parameters determined and stored by the DHCP client 320 as a MAC address for providing a gateway between the PCs 110 and the Internet 130. Because MAC addresses are globally unique, the DHCP server 310 can assume that a MAC address that exists on the WAN side of the NAT device 140 will not also exist on the LAN side. As such, the DHCP server 310 will utilize a MAC address determined on the WAN side of the NAT device 140 (such as the MAC address of the WAN side router), as the MAC address for the LAN side router.

Figure 4:
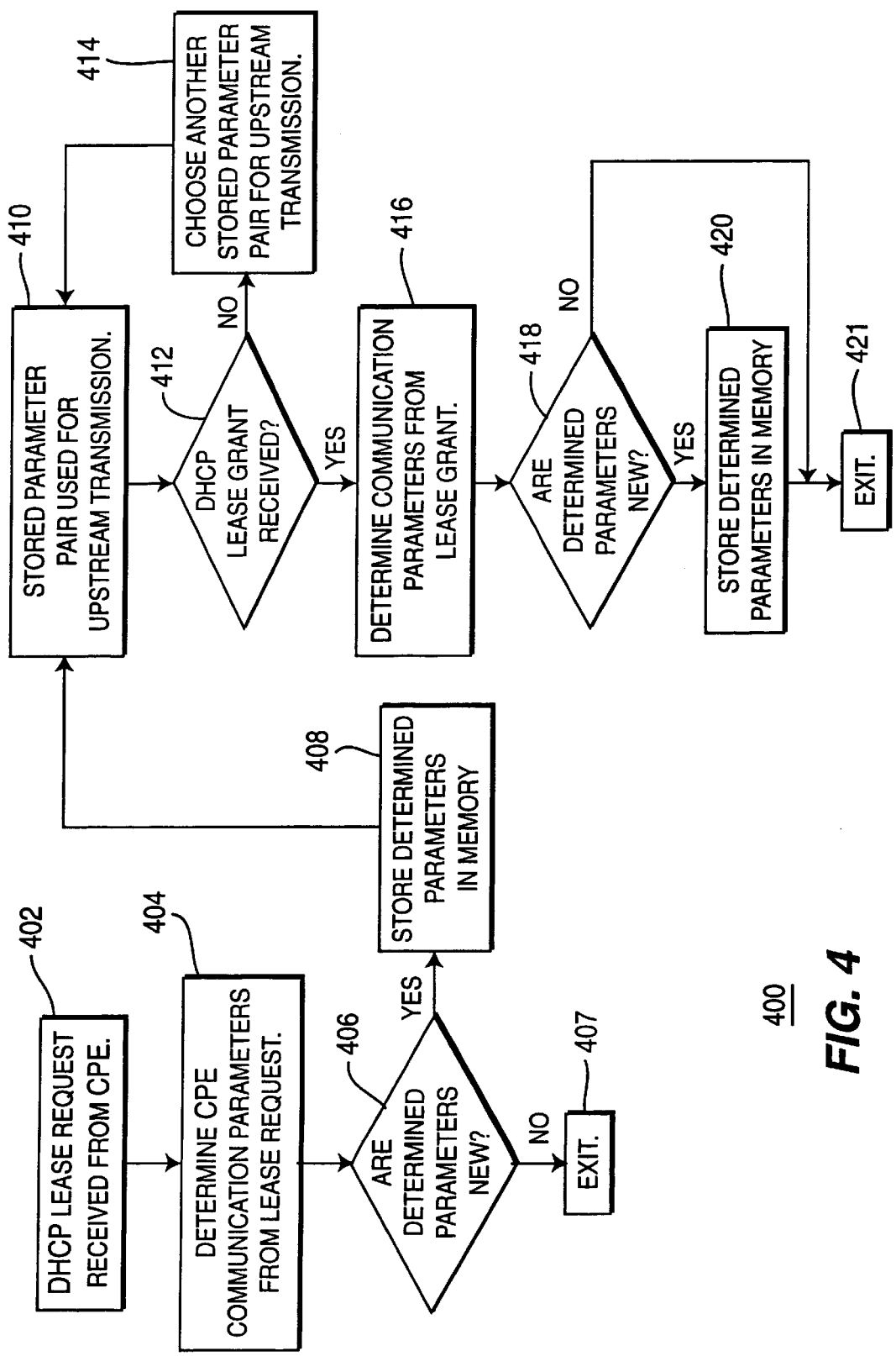
FIG. 4 depicts a flow diagram of an exemplary method in accordance with the principles of the present invention.

FIG. 4 depicts a flow diagram of an exemplary method in accordance with the principles of the present invention. The method 400 is entered at step 402 when a DHCP lease request from a CPE device is received by a LAN side DHCP server of a NAT device. The method 400 then proceeds to step 404.

At step 404, the method 400 determines the communication parameters of the DHCP lease request. That is, the DHCP server determines the communication parameters, such as the MAC address and the host name pair, of the requesting CPE device from the DHCP lease request from the CPE device.

At step 406, the method 400 determines if the communication parameters are new. That is, the DHCP server checks an existing parameter list in a memory, available to both the DHCP server and a DHCP client, to determine if the parameters are new. If the parameters are new, the method 400 proceeds to step 408. If the parameters are not new, the method 400 is exited at step 407.

At step 408, the method 400 enables the determined communication parameters to be used by a DHCP client. That is, the DHCP server stores the determined parameters in the shared memory. The method 400 proceeds to step 410.

At step 410, the method 400 uses the stored communication parameters for upstream transmission. That is, the DHCP client uses a pair of parameters (MAC address and host name pair) determined and stored by the DHCP server in the shared memory to issue a DHCP lease request to a WAN DHCP server. The method 400 proceeds to step 412.

At step 412, the method 400 determines if a lease grant has been issued from an upstream device. That is, if the parameter pair used by the DHCP client produces a lease grant from the WAN DHCP server, the method proceeds to step 416. If the parameter pair used by the DHCP client does not produce a lease grant from the WAN DHCP server, the method proceeds to step 414.

At step 414, the DHCP client chooses another parameter pair determined and stored by the DHCP server. The method then returns to step 410.

At step 416, the method 400 determines the communication parameters of the DHCP lease grant. That is, upon receiving a lease grant from the WAN DHCP server, the DHCP client determines the communication parameters of the lease grant issued by the WAN DHCP server.

At step 418, the method determines if the communication parameters are new. That is, the DHCP client determines the communications parameters, such as the MAC address from the lease grant, and checks an existing parameter list in the shared memory to determine if the parameters are new. If the parameters are new, the method 400 proceeds to step 420. If the parameters are not new, the method 400 is exited.

At step 420, the method 400 enables the determined communication parameters to be used by the DHCP server. That is, the DHCP client stores the determined parameters in the shared memory. The method 400 is then exited at step 421.

It should be noted that the determined communication parameters stored in the shared memory by the DHCP client are subsequently used by the DHCP server of the NAT device. That is, the DHCP server uses one of the parameters determined and stored by the DHCP client as a MAC address for providing a gateway between the CPE devices and an Internet.

While the forgoing is directed to some embodiments of the present invention, other and further embodiments of the invention may be devised without departing from the basic scope thereof. As such, the appropriate scope of the invention is to be determined according to the claims, which follow.

What is claimed is:

1. A method, comprising: receiving, at a first dynamic host configuration protocol (DHCP) device, a DHCP lease request from a client, wherein the first DHCP device includes a DHCP server;

determining, from the DHCP lease request, first communication parameters of said client; and enabling said determined first communication parameters to be used by a, second DHCP device, wherein the second DHCP device includes a DHCP client said determined first communication parameters adapted for use in upstream DHCP lease requests by said second DHCP device, wherein said first communication parameters of said client is a MAC address and host name of said requesting client.

2. The method of claim 1, further comprising:
storing said determined first communication parameters in a memory available to said first DHCP device and said second DHCP device.

3. The method of claim 1, further comprising:
determining, from a DHCP lease grant sent in response to said upstream DHCP lease request by said second DHCP device, second communications parameters; and
enabling said determined second communication parameters to be used by said first DHCP device.

4. The method of claim 3, wherein said determined second communication parameters are MAC addresses.

5. The method of claim 3, further comprising:
storing said determined second communication parameters in a memory available to said first DHCP device and said second DHCP device.

6. The method of claim 1, wherein said first DHCP device comprises a DHCP server.

7. The method of claim 1, wherein said second DHCP device comprises a DHCP client.

8. An apparatus, comprising:
a first dynamic host configuration protocol (DHCP) device, for receiving DHCP lease requests from a client, wherein the first DHCP device includes a DHCP server;
a second DHCP device, for generating upstream DHCP lease requests, wherein the second DHCP device includes a DHCP client;
a memory for storing communications parameters and instructions; and
a processor, upon executing said instructions, configured to:
receive at said first DHCP device, a DHCP lease request from said client;
determine, from the DHCP lease request, first communication parameters of said client; and
enable said determined first communication parameters to be used by a second DHCP device, said determined first communication parameters adapted for use in upstream DHCP lease requests by said second DHCP device, wherein said first communication parameters of said client is a MAC address and host name of said requesting client.

9. The apparatus of claim 8, wherein said processor, upon executing said instructions, is further configured to:
determine, from a DHCP lease grant sent in response to said upstream DHCP lease request by said second DHCP device, second communications parameters; and
enable said determined second communication parameters to be used by said first DHCP device.

10. The apparatus of claim 8, wherein said first DHCP device comprises a DHCP server.

11. The apparatus of claim 8, wherein said second DHCP device comprises a DHCP client.

12. The apparatus of claim 8, wherein said apparatus is incorporated into an edge networking device.

13. The apparatus of claim 12, wherein said edge networking device is a cable modem.

14. The apparatus of claim 12, wherein said edge networking device is a router.

15. Computer-readable medium for storing a set of instructions, wherein when said set of instructions is executed by a processor performs a method comprising:
receiving, at a first dynamic host configuration protocol (DHCP) device, a DHCP lease request from a client, wherein the first DHCP device includes a DHCP server;
determining, from said DHCP lease request, first communication parameters of said client; and
enabling said determined first communication parameters to be used by a second DHCP device, wherein the second DHCP device includes a DHCP client, said determined first communication parameters adapted for use in upstream DHCP lease requests by said second DHCP device, wherein said first communication parameters of said client is a MAC address and host name of said requesting client.

16. A method for self-configuration of a NAT device, comprising:
receiving, at a first dynamic host configuration protocol (DHCP) device, a DHCP lease request from a client, wherein the first DHCP device includes a DHCP server;
determining, from the DHCP lease request, first communication parameters of said client (110);
enabling said determined first communication parameters to be used by a second DHCP device, wherein the second DHCP device includes a DHCP client device, said determined first communication parameters adapted for use in upstream DHCP lease requests by said second DHCP device;
determining, from a DHCP lease grant sent in response to said upstream DHCP lease request by said second DHCP device, second communications parameters; and
enabling said determined second communication parameters to be used by said first DHCP device, wherein said first communication parameters and second communication parameters of said client is a MAC address and host name of said requesting client.

17. A communication network, comprising:
a local area network (LAN);
a wide area network (WAN);
a network address translator (NAT), comprising,
a first dynamic host configuration protocol (DHCP) device, for receiving DHCP lease requests from said LAN, wherein the first DHCP device includes a DHCP server
a second DHCP device, for generating upstream DHCP lease requests to said WAN, wherein the second DHCP device includes a DHCP client
a memory for storing communications parameters and instructions; and
a processor, upon executing said instructions, configured to:
receive at said first DHCP device, a DHCP lease request from said LAN;
determine, from the DHCP lease request, first communication parameters of said LAN; and
enable said determined first communication parameters to be used by a second DHCP device, said determined first communication parameters adapted for use in upstream DHCP lease requests by said second DHCP device to said WAN, wherein said first communication parameters of said client is a MAC address and host nae of said requesting client.

18. An apparatus, comprising:

means for receiving, at a first dynamic host configuration protocol (DHCP) device, a DHCP lease request from a client, wherein the first DHCP device includes a DHCP server means for determining, from the DHCP lease request, first communication parameters of said client; and means for enabling said determined first communication parameters to be used by a second DHCP device, wherein the second DHCP device includes a DHCP client said determined first communication parameters adapted for use in upstream DHCP lease requests by said second DHCP device, wherein said first communication parameters of said client is a MAC address and host name of said requesting client.

* * * * *